(12) United States Patent
Sharman

(10) Patent No.: US 7,319,544 B2
(45) Date of Patent: Jan. 15, 2008

(54) PROCESSING OF DIGITAL IMAGES

(75) Inventor: Richard A. Sharman, Dunstable (GB)

(73) Assignee: Eastman Kodak Company, Rochester, NY (US)

( * ) Notice: Subject to any disclaimer, the term of this patent is extended or adjusted under 35 U.S.C. 154(b) by 975 days.

(21) Appl. No.: 10/437,127

(22) Filed: May 13, 2003

(65) Prior Publication Data
US 2003/0214663 A1    Nov. 20, 2003

(30) Foreign Application Priority Data
May 18, 2002  (GB)  ................................. 0211486.6

(51) Int. Cl.
*H04N 1/40* (2006.01)
(52) U.S. Cl. ........................................ 358/1.9; 358/2.1
(58) Field of Classification Search ................ 358/1.9, 358/2.1, 468, 443, 530; 382/272
See application file for complete search history.

(56) References Cited

U.S. PATENT DOCUMENTS

| | | | |
|---|---|---|---|
| 2,571,697 A | 10/1951 | Evans | |
| 4,638,350 A | 1/1987 | Kato et al. | |
| 4,677,465 A | 6/1987 | Alkofer | |
| 4,729,016 A | 3/1988 | Alkofer | |
| 4,883,360 A | 11/1989 | Kawada et al. | |
| 4,954,884 A | 9/1990 | Nakayama et al. | |
| 5,420,704 A | 5/1995 | Winkelman | |
| 5,436,734 A * | 7/1995 | Yamauchi et al. | .......... 358/448 |

FOREIGN PATENT DOCUMENTS

| | | |
|---|---|---|
| EP | 0 843 465 | 5/1998 |
| EP | 1 014 695 | 6/2000 |

* cited by examiner

*Primary Examiner*—David Moore
*Assistant Examiner*—Stephen Brinich
(74) *Attorney, Agent, or Firm*—Frank Pincelli

(57) ABSTRACT

A method of correcting a digital image comprises the steps of removing unrepresentative pixels, measuring the mean levels of the remaining pixels for each channel, determining an aim mean for each channel from the measured aim mean, determining a correction level, calculating a power law correction for each channel from the aim mean and the correction level and applying the power law correction to the input image to give a corrected output image.

20 Claims, 6 Drawing Sheets

PROCESSING OF DIGITAL IMAGES

CROSS REFERENCE TO RELATED APPLICATIONS

This is a U.S. original patent application which claims priority on Great Britain patent application No. 0211486.6 filed May 18, 2002.

FIELD OF THE INVENTION

This invention relates to the manipulation of digital images, in particular to the color balancing of digital images.

BACKGROUND OF THE INVENTION

The proportion of digital images requiring printing or display is growing with the increasing use of digital images in the home, office and on the internet. The originating equipment is typically a digital camera or scanner. In the case of a digital camera, the scene illumination may be less than ideal, resulting in a color balance error on the final image. In the case of a print scanner the color cast in the original print could give an unacceptable scanned version of the print. Even if the originating equipment provides an accurate 'well balanced' image any subsequent processing may introduce color casts that need correction.

There are a large number of white balance patents for digital and video cameras but they have the advantage of sampling the color of the light before any non-linear processing and subsequent clipping. U.S. Pat. No. 4,883,360 and U.S. Pat. No. 4,954,884 are typical for digital cameras and U.S. Pat. No. 4,638,350 is typical for video cameras.

There are also a large number of patents relating to color balance of photographic printers where they have to accommodate the large range of exposures on color negative film. Many make use of tone scale statistics within the image such as that taught in EP 1014695 and other more complex methods such as taught in U.S. Pat. No. 4,677,465 and U.S. Pat. No. 4,729,016. The consequence is that they have to be more aggressive than is needed for digital cameras resulting in the possibility of a greater number of color balance failures than would be the case with a restricted color balance range. All of these rely on being able to process accurate unclipped image data which is not available from digital images submitted for printing.

The problem with color balancing digital cameras is that clipped highlights and shadows remain neutral even when the mid-range image data requires color balancing. This invention aims to be able to take any digital image and correct it for color balance whilst maintaining the neutrality of any highlights or shadows.

SUMMARY OF THE INVENTION

According to the present invention there is provided a method of correcting a digital image comprising a plurality of channels, the method comprising the steps of eliminating unrepresentative pixels, measuring the mean level of the remaining pixels for each channel, determining an aim mean for each channel from the measured mean levels, determining a correction level, calculating a power law correction for each channel from the aim mean level and the correction level and applying the power law correction to the input image data to give a corrected output image.

Preferably the unrepresentative pixels are eliminated by means of at least one mask.

The invention allows any digital image to be color balanced whilst maintaining neutral shadows and highlights. The images can be color balanced without knowing the source of the image. No operator intervention is required.

BRIEF DESCRIPTION OF THE DRAWINGS

The invention will now be described, by way of example, with reference to the accompanying drawings, in which.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
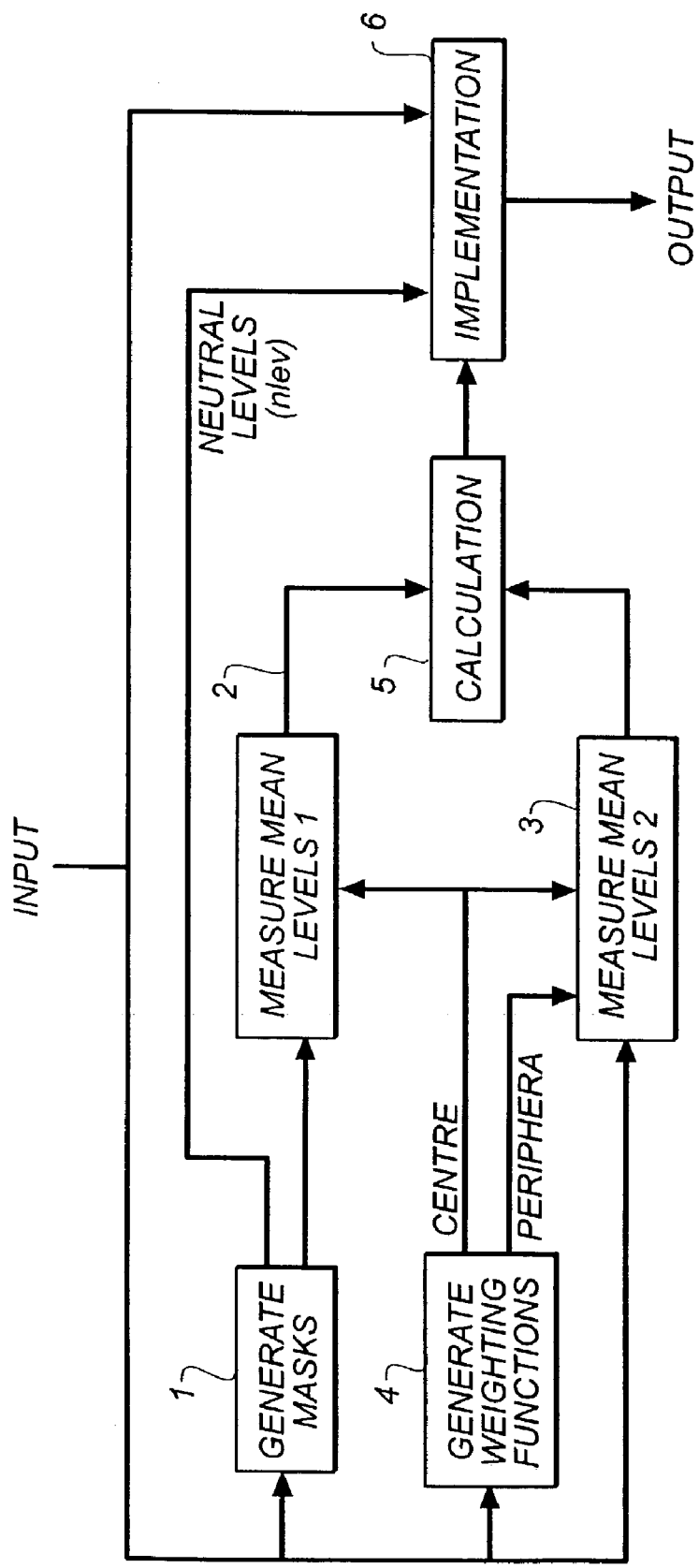
FIG. 1 is a block diagram illustrating the method of the invention.

FIG. 1 illustrates the method of the invention.

The method can be divided into three stages. The first stage, the analysis of the image data to extract color balance information, takes place in blocks 1, 2, 3 and 4 in FIG. 1. The second stage, a calculation stage using the extracted information to give a corrected figure, takes place in block 5. The third stage, the final application of the correction on the image data, takes place in block 6. Each of these stages will be described in more detail below.

In block 1 the analysis process uses a number of masks to remove unrepresentative pixels from the color analysis. Typically the masks eliminate pixels which are clipped or which are highly saturated. This is described in more detail below, with respect to FIG. 2. Block 1 additionally measures the extent of the neutral highlights and shadows and passes the information on to block 6. In block 2 the mean level of the pixels remaining after the masking of block 1 is measured to obtain a measure of the color balance of the image. In block 4 a weighting generator generates two spatial weighting functions. These weighting functions are used to weight mean level measurements of the input image toward the centre of the image or toward the periphery of the image. For the color balance measurement, measured in block 2, the weighting is toward the centre of the image to give a greater bias toward the likely position of the subject of the image. These weighting functions, although preferred, are not essential to the invention.

In block 3 two mean levels of the input image are measured, one with a centre weighting and one with a peripheral weighting. The ratio of the two measurements is output from block 3 and used to set the correction level used in block 5. In calculation block 5 the measurement of the color balance from block 2 is combined with the measurements from block 3 to generate a new aim mean level for each color or channel. A power law correction, based on the required shift in mean level, is calculated for each color or channel and sent to the output implementation block, block 6. In block 6 the input data is normalized and the neutral levels masked out. Each color separation of the remaining data is passed through the corresponding power law correction, to move the mean level of each separation toward its new aim mean level. The corrected data is then re-scaled and added back to the neutral highlight and shadow data to give a color corrected output.

Figure 2:
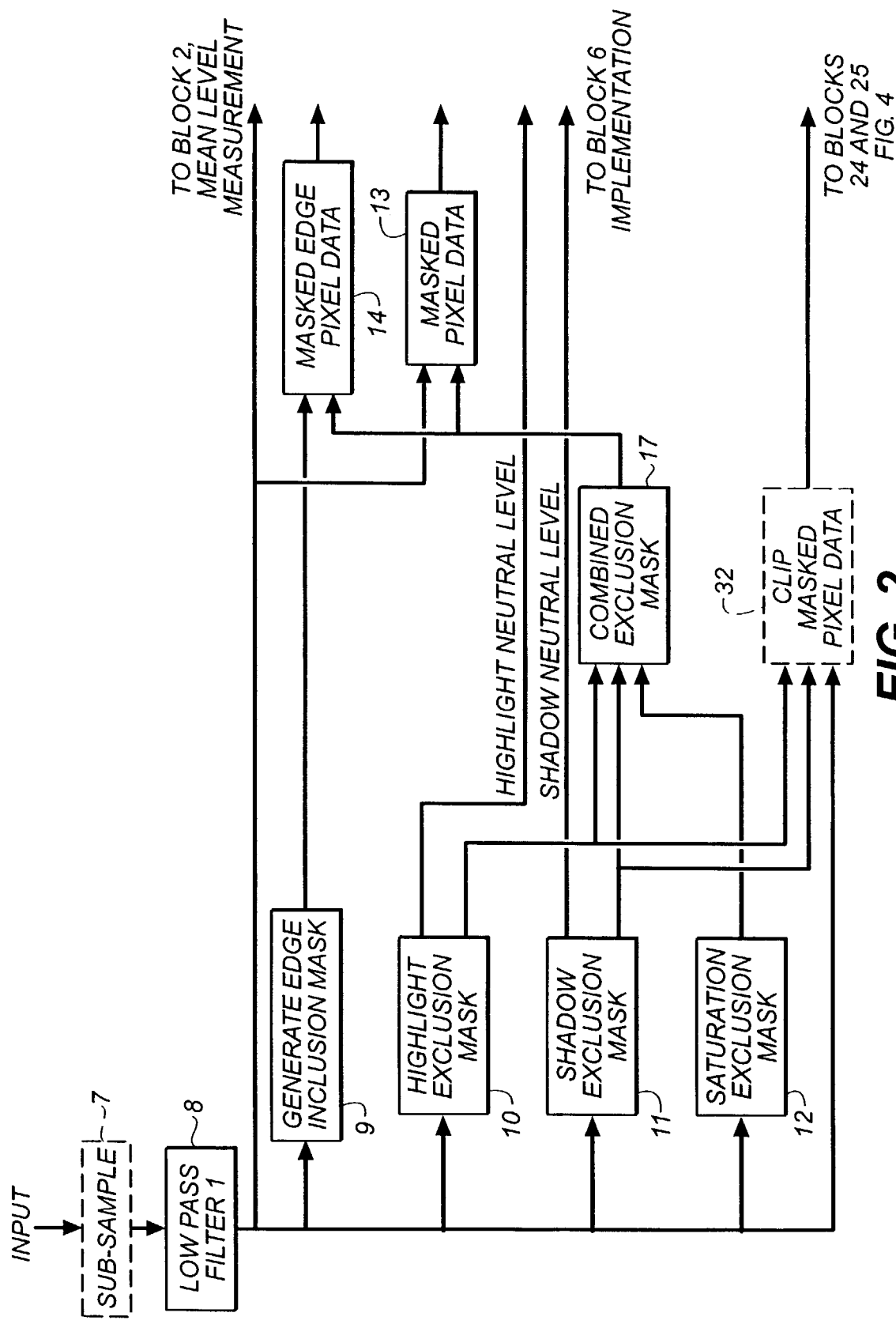
FIG. 2 is a block diagram illustrating the steps taking place in block 1 of FIG. 1.

FIG. 2 is an expansion of block 1 in FIG. 1. In the embodiment illustrated the input data for analysis is first sub-sampled, in block 7, to reduce the computing time and then low-pass filtered, in block 8, to remove noise. However these are not essential steps to the invention. The conditioned data, i.e. the sub-sampled and filtered data, is then passed to the various masks, blocks 9, 10, 11 and 12, before the mean level analysis, to determine the color balance of the image.

Figure 3:
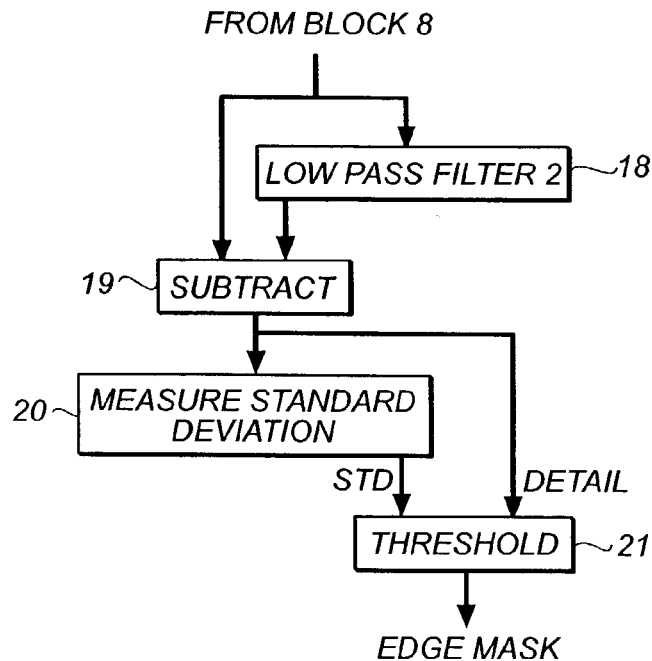
FIG. 3 is a block diagram illustrating the steps taking place in block 9 of FIG. 2.

An edge inclusion mask is generated, in block 9, in order to measure the mean level of just the edge pixels, i.e. where detail is found in the image. This eliminates uniform areas of the image from the measurement. FIG. 3 is an expansion of block 9. The output from block 8 is further low pass filtered in block 18. In block 19 a low pass filtered version of the analysis data is subtracted from itself and generates a high pass filtered signal. The standard deviation of the high pass filtered signal is measured in block 20. This standard deviation is used to set an adaptive threshold for the generation of the edge detail mask in block 21. A scaling factor, 'Scale' in equation 1, for the standard deviation can be set to optimize the resulting mask. This could, for example, be 0.5.

$$\text{EdgeMask}=1 \text{ when } |\text{Detail}|>(\text{Std}*\text{Scale}) \quad (1)$$

A highlight exclusion mask is generated in block 10. This highlight exclusion mask eliminates triply clipped and near triply clipped pixels from the analysis. These pixels will always be neutral and can only detract from the color measurement. The mask is true if all three channels are above the white threshold. The minimum code value for which the highlights are neutral is set empirically. Generally it will be maximum digital data value, and this value will be used in the implementation block, block 6. Peculiar to digital camera images is the possibility that the camera processing has already made the shadows neutral. This is not true of all digital cameras but if the shadows are already neutral the color balancing process of the present invention should not make them colored.

A shadow exclusion mask is generated in block 11. This shadow exclusion mask detects the neutral shadows and eliminates those pixels from the analysis. The maximum code value for which the shadows are neutral is determined, generally it will be the data minimum value. This value is typically zero but may go up to 20, for example, in an 8 bit system. This value will be used later in the implementation block, block 6. Together, blocks 10 and 11 determine the neutral levels.

A third exclusion mask, a saturation mask, is generated in block 12. This is not essential to the invention but is a preferred feature. This mask eliminates highly saturated areas of the image from the analysis. The saturation threshold is adaptive. Equations 2, 3 and 4 below are shown as an example set of equations for deriving the saturation mask. In this example the mask is derived by taking the sum of the absolute differences between an equal weight neutral and each color, as shown in equations 2 and 3. The maximum level of the saturation from equation 3 is used to set an adaptive threshold for the saturation mask generation, equation 4.

$$\text{Neutral}=(\text{Red}+\text{Green}+\text{Blue})/3 \quad (2)$$

$$\text{Saturation}=(|\text{Neutral}-\text{Red}|+|\text{Neutral}-\text{Green}|+|\text{Neutral}-\text{Blue}|) \quad (3)$$

Saturation mask=1 when $$(|\text{Neu}-\text{Red}|)>\text{thresh}) \text{ AND } (|\text{Neu}-\text{Green}|)>\text{thresh}) \\ \text{ AND } (|\text{Neu}-\text{Blue}|)>\text{thresh}) \quad (4)$$

Where Neu is the Neutral from equation 2

Thresh=saturation scale factor*maximum saturation from equation 3

The 'saturation scale factor' is optimized during development. A typical value could, for example, be 0.4.

The three exclusion masks, from blocks 10, 11 and 12, are combined into a composite exclusion mask in block 17. This mask is then applied to the image data in blocks 13 and 14. In block 13 the mean level of the whole image is measured. In block 14 the mean level of the edge, i.e. detail, of the image is measured. The outputs from blocks 13 and 14 are passed to the centre weighted mean level measurement block, block 2 in FIG. 1, to generate two sets of mean level data, representative of the color balance of the image. The image data for the color correction level can be optionally masked, by highlight and shadow clip masks, in block 32 before being passed to block 24, for the centre weighted mean level measurement, and block 25 for the peripheral mean level measurement. Blocks 24 and 25 are explained further with respect to FIG. 4.

Figure 4:
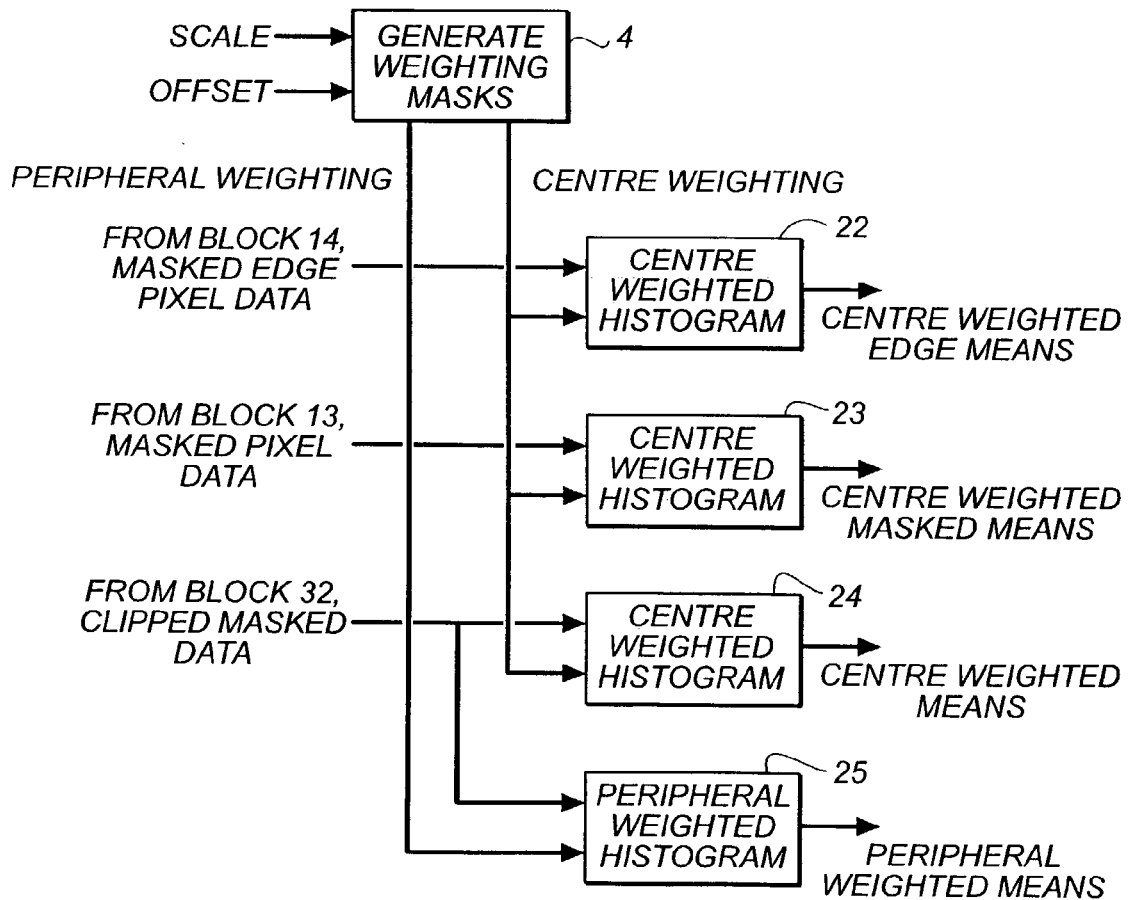
FIG. 4 is a block diagram illustrating the steps taking place in blocks 2 and 3 of FIG. 1.

FIG. 4 is an expansion of blocks 2 and 3 from FIG. 1.

The weighting functions generated in block 4 are used to generate the weighting plane, using an offset gausian or cosine function. An offset level is used to set the peripheral weighting, i.e. the weighting for the periphery of the image, and a scaling factor is used to set the central weighting, i.e. the weighting for the centre of the image. The scale could be set to clip the central area to give it a uniform weighting.

In block 22 the means for each color for the edge, i.e. detail, masked image are determined using a centre weighted histogram. In block 23 the means for each color for the whole masked image are determined using a centre weighed histogram. Block 23 is preferable but not essential to the invention. The means are a measure of the color balance of the image and are used to determine the aim mean in the calculation block, block 5. The spatial weighting in the histogram varies the equivalent value of a pixel with respect to its position in the image, i.e. a pixel of a particular data value will always contribute to the same histogram bin, but unless it is at the centre of the picture it will not be worth a full pixel. In blocks 24 and 25 the means of the filtered image data, from block 32, are determined using centre weighted histograms (in block 24) and peripheral weighted histograms (in block 25). These means, i.e. the outputs of blocks 24 and 25 are used to determine the color correction level of the aim means calculated from the outputs of blocks 22 and 23 in the calculation block, block 5.

Figure 5:
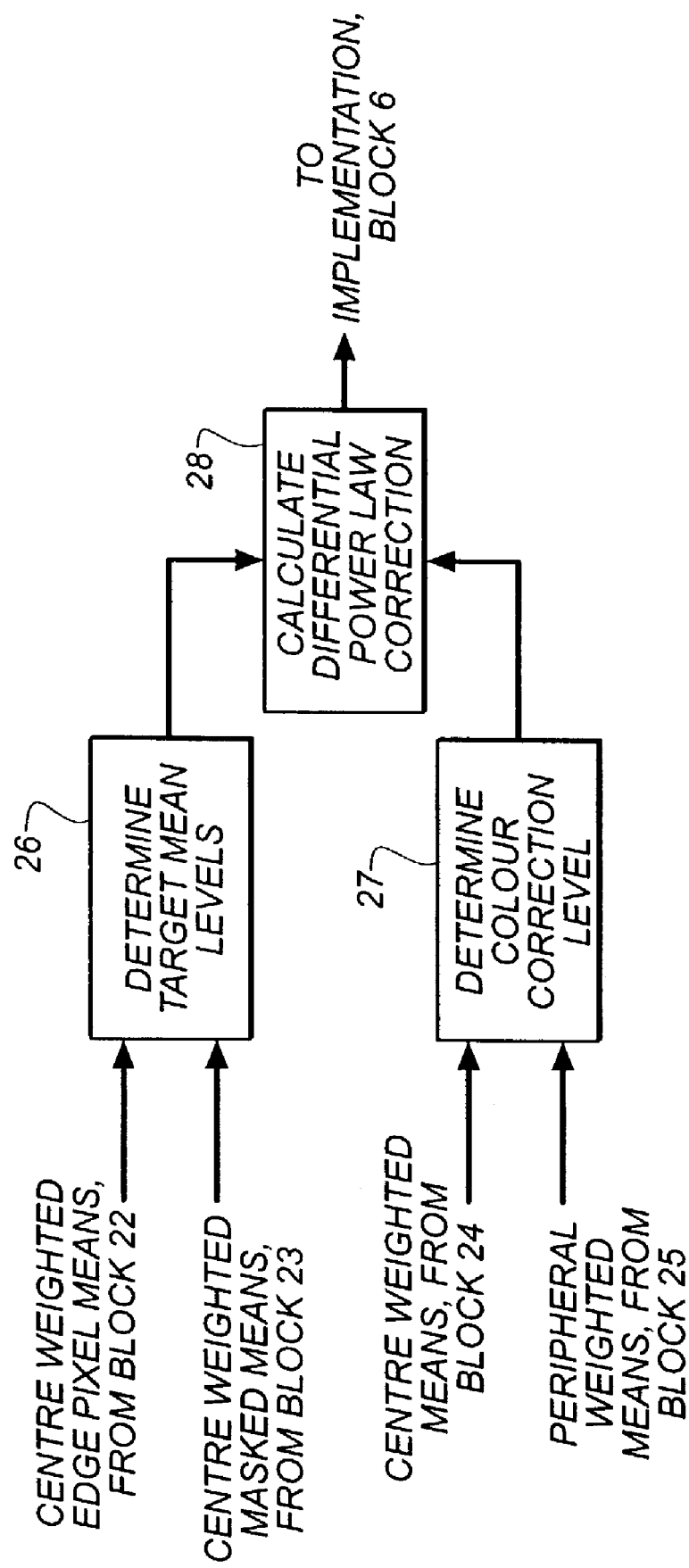
FIG. 5 is a block diagram illustrating the steps taking place in block 5 of FIG. 1.

FIG. 5 is an expansion of block 5 in FIG. 1. In block 26 the aim mean level for each color is determined, using the outputs of blocks 22 and 23 and any preferred color balance set by parameters, e.g. Red$_{pref}$ and Blue$_{pref}$. In block 27 the color correction level is determined using the outputs of blocks 24 and 25. The aim mean level and the color correction level are combined in block 28 to give the power law corrections for the implementation block, block 6, in FIG. 1.

In block 26 the mean level for each color channel is comprised of a combination of the edge pixel mean (edgemean) and the masked mean of the whole image (maskedMean). Equation 5 is an example of the calculation used for the red channel. It will be understood that other color channels would be similarly calculated.

$$R_{mean} = A*R_{edgemean} + B*R_{maskedMean} \quad (5)$$

Where 'A' and 'B' are each between 0 and 1 but also where A+B=1

An average of the color mean levels is calculated and used as the neutral aim level, Aim$_{average}$. The neutral aim level may not necessarily be an equal weight neutral. An example is shown in equation 6 below.

$$\text{Aim}_{Average} = (R_{mean} + G_{mean} + G_{mean} + B_{mean})/4 \quad (6)$$

At this point the aim mean level for each color is the same in order, ultimately, to give a neutral color balance to the image. However it may be preferred to have a warmer balance to the image. In this case Red$_{pref}$ and Blue$_{pref}$ could be used.

To modify the red channel the following equation would be used:

$$\text{Red}_{aim} = \text{Aim}_{Average} * \text{Red}_{pref} \quad (7)$$

A similar equation would be used to determine Blue$_{aim}$. Red$_{pref}$ could for example have a value of 1.05 and Blue$_{pref}$ could have a value of 0.95.

The color correction level is calculated in block 27. This sets the level to which the color means calculated in equation 5 are moved toward the Aim$_{Average}$ from equations 6 or 7. It is set by the difference in mean level between the centre weighted means and the peripheral weighted means for each color. The difference can be measured in a number of ways. Equation 8 below gives an example based on normalized difference. The level of color correction is set by the normalized difference between the centre and peripheral means of the image data obtained from blocks 24 and 25. The bigger the difference the lower the correction. The equation is weighted toward green, but it will be understood that any combination could be used to suit the range of images being balanced.

$$\text{Difference} = \frac{(|RcentreMean - RedgeMean|)}{(RcentreMean + RedgeMean)} + 2* \quad (8)$$
$$\frac{(|GcentreMean - GedgeMean|)}{(GcentreMean + GedgeMean)} +$$
$$\frac{(|BcentreMean - BedgeMean|)}{(BcentreMean + BedgeMean)}$$

The 'difference' factor may then be scaled and raised to a power, when optimizing the algorithm to the image population being processed, to give the final color correction factor, C$_{correction}$.

$$\text{e.g. } C_{correction} = (\text{Difference}*\text{scale})^{power} \quad (9)$$

In block 28 the aim mean levels and the color correction level are combined to give the corresponding differential power law corrections. At this point the level of correction for each color can also be varied to suit the population images being processed. The power law correction is calculated from normalized data and an example is shown in equation 10.

$$G_{correction} = (\log_{10} \text{Aim}_{Average})/(\text{Log}_{10}((G_{mean} + C_{correction}*\text{Aim}_{Average})/(1+C_{correction}))) \quad (10)$$

Figure 6:
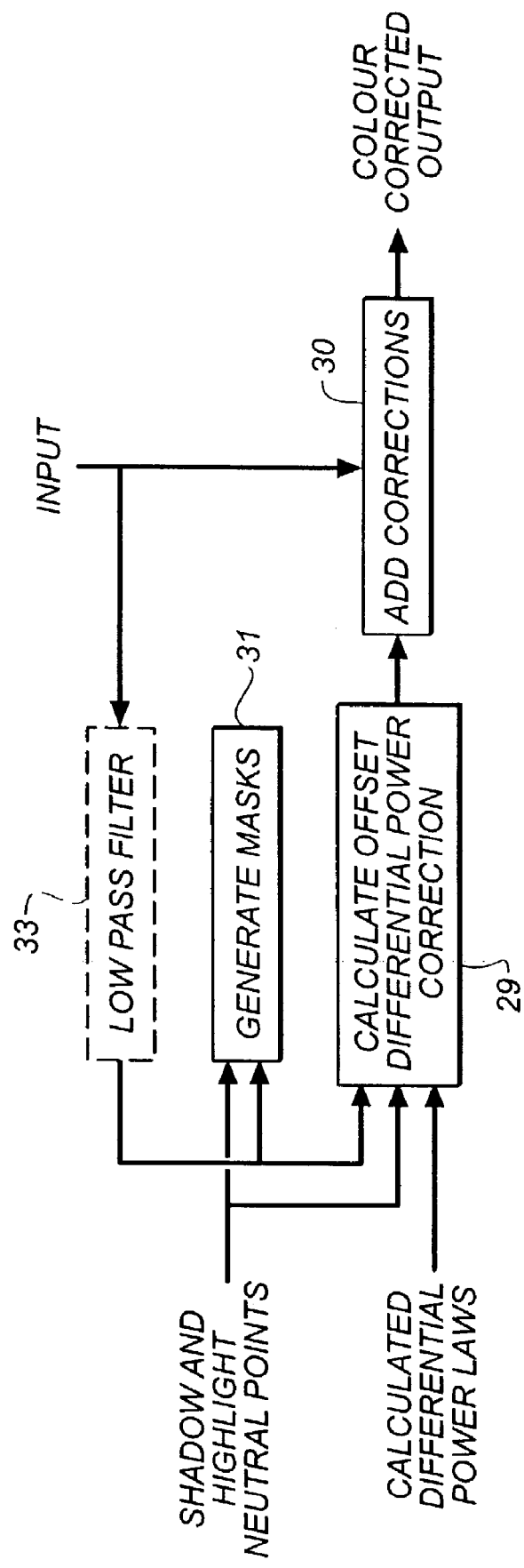
FIG. 6 is a block diagram illustrating the steps taking place in block 6 of FIG. 1.

A similar correction is made for the red and blue channels. FIG. 6 is an expansion of block 6 of FIG. 1.

In block 6 the power law correction obtained from block 28 is applied to the input data after removal of the neutral levels and the appropriate color mask in block 29. The color mask is generated in block 31. Equation 11 given below, is used to generate the mask. Green is used as the example.

$$G_{mask} = 1 \text{ when } (G_{in} < n\text{lev}) \quad (11)$$

where nlev is the neutral level and G$_{in}$ is the green input data

In block 29 the neutral level data is subtracted and the remaining data power law corrected.

$$G_{corrected} = ((G_{in} - n\text{lev})*\overline{G_{mask}})^{G_{correction}} \quad (12)$$

Finally in block 30 the corrected data, the masked green data and the neutral data is recombined to give the color corrected output.

$$G_{out} = G_{corrected} + G_{mask}*G_{in} + \overline{G_{mask}}*n\text{lev} \quad (13)$$

Where G$_{in}$ is the green input data, nlev is the neutral level and G$_{mask}$ is the green mask.

It will be understood that similar corrections are made to the red and blue channels to give color corrected red and blue outputs.

The correction data may be optionally low pass filtered in block 33, to reduce any noise addition or missing codes due to the non-linear nature of the correction. If the correction data is being low pass filtered, then $G_{out}$, equation 13, is subtracted from the filtered $G_{in}$ to give just the correction data which is then added onto the full band image data in block 30.

The present invention, either as a stand alone algorithm or a component part of a broader algorithm may be included in a range of applications in which digital images are input, images captured digitally, or film images scanned; digital image processing performed; and digital images output, stored or printed. These applications include digital processing laboratories (mini and wholesale), kiosks, internet fulfillment, and commercial or home computer systems with appropriate peripherals, digital cameras and so on.

Figure 7:
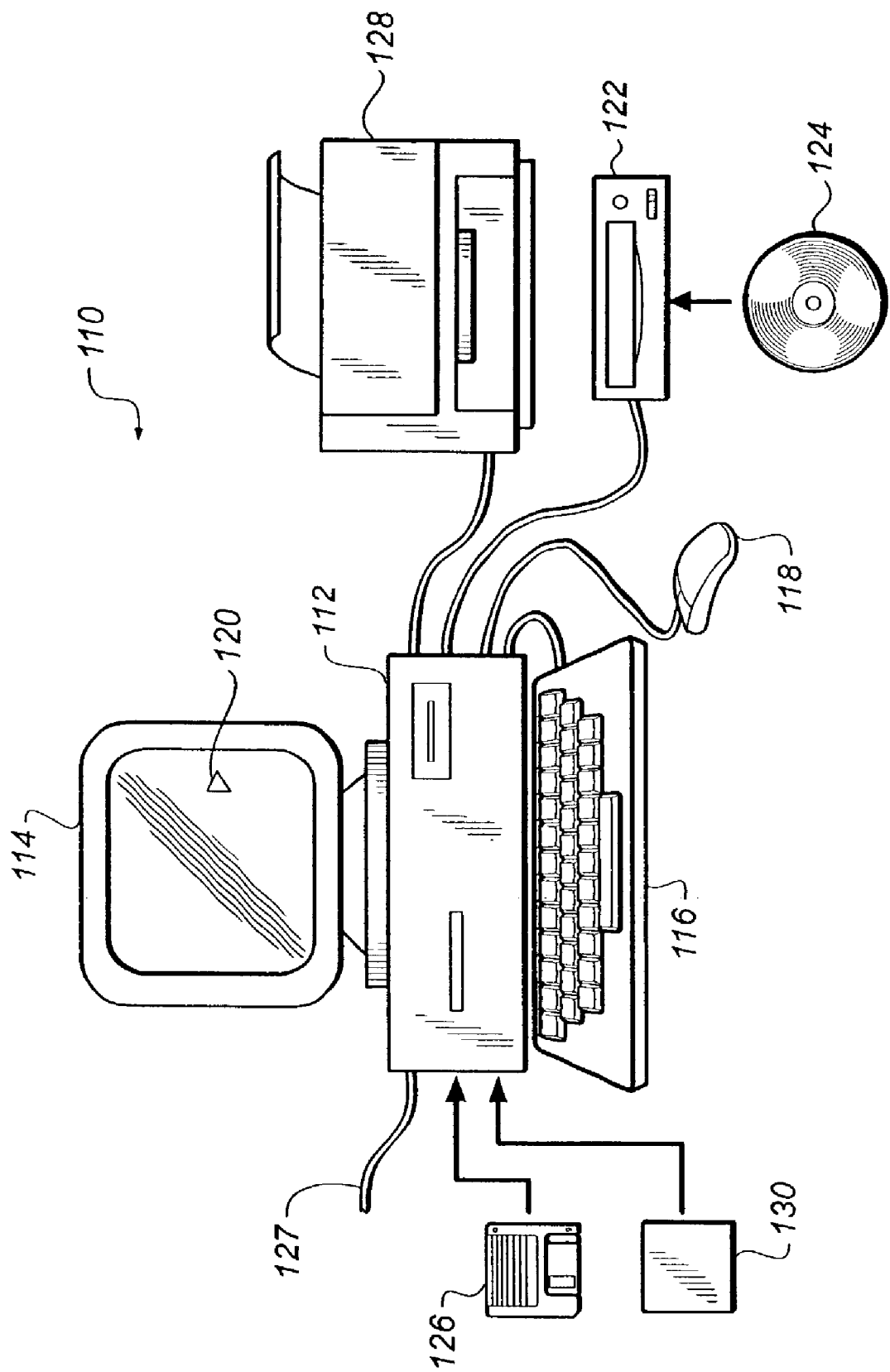
FIG. 7 is a perspective diagram of a computer system for implementing the present invention.

Referring to FIG. 7, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). In accordance with the invention, the algorithm may be stored in any of the storage devices heretofore mentioned and applied to images in order to color balance the images.

It is to be understood that various modifications and changes may be made without departing from the present invention, the present invention being defined by the following claims.

What is claimed is:

1. A method of correcting an input digital image comprising a plurality of channels, the method comprising the steps of:
   eliminating unrepresentative pixels,
   measuring the mean level of the remaining pixels for each channel,
   determining an aim mean for each channel from the measured mean levels,
   determining a correction level,
   calculating a power law correction for each channel from the aim mean level and the correction level,
   applying the power law correction to the input image data to give a corrected output image, and
   outputting the corrected output image.

2. A method as claimed in claim 1 wherein the unrepresentative pixels are eliminated by means of at least one mask.

3. A method as claimed in claim 2 wherein an edge pixel mask is used to eliminate uniform areas of the image.

4. A method as claimed in claim 2 wherein a highlight exclusion mask is used to eliminate unrepresentative clipped pixels.

5. A method as claimed in claim 2 wherein a shadow exclusion mask used to eliminate neutral shadows.

6. A method as claimed in claim 2 wherein an exclusion mask eliminates pixels whose color saturation is above a pre-set threshold.

7. A method as claimed in claim 6 wherein the threshold is adaptive.

8. A method as claimed in claim 3 wherein the mean level used to determine the aim mean for each channel is combination of the mean levels of the pixels remaining after each mask.

9. A method as claimed in claim 3 wherein the mean level used to determine the aim mean for each channel comprises a combination of the mean level of the pixels remaining after the exclusion masks and the mean level of the pixels after the application of the edge pixel mask.

10. A method as claimed in claim 1 wherein the aim mean comprises a combination of the mean levels of each channel.

11. A method as claimed in claim 10 wherein the aim mean is an equally weighted combination of the mean level of each channel.

12. A method as claimed in claim 1 wherein the mean level is calculated for both centre weighted pixels and peripheral weighted pixels.

13. A method as claimed in claim 12 wherein the correction level is inversely proportional to the difference between the centre weighted mean level to the peripheral weighted mean level.

14. A method as claimed in claim 13 wherein the power law correction is calculated from a combination of the mean level for each channel, the aim mean and the correction level.

15. A method as claimed in claim 1 wherein the power law correction is applied to the image data after elimination of neutral shadows and highlights, the corrected data and neutral data being recombined to give the corrected output image.

16. A method as claimed in claim 1 wherein the input image data is low pass filtered prior to correction, the resulting data being subtracted from the uncorrected filtered data to give filtered correction data, the filtered correction data being added to the image data to give a final corrected output image.

17. A computer-readable medium storing a computer program comprising code means for performing all the steps of claim 1 when said program is run on a computer.

18. A system for the processing of digital image data comprising:
   a microprocessor-based unit
   a computer readable medium connected to the microprocessor-based unit storing instructions configured to cause the microprocessor-based unit at least to;
   receive a digital image;
   process the digital image, thereby generating a corrected output image; and
   output the corrected output image,
   wherein the processing of the digital image comprises a method according to claim 1.

19. A computer program product for correcting a digital image comprising a computer readable storage medium having a computer program stored thereon for performing the steps of;
   eliminating unrepresentative pixels,
   measuring the mean level of the remaining pixels for each channel,
   determining an aim mean for each channel from the measured mean levels,
   determining a correction level,
   calculating a power law correction for each channel from the aim mean level and the correction level,
   applying the power law correction to the input image data to give a corrected output image, and
   outputting the corrected output image.

20. A device for correcting a digital image comprising a plurality of channels, the apparatus comprising means for eliminating unrepresentative pixels, means for measuring the mean level of the remaining pixels for each channel, means for determining an aim mean for each channel from the measured mean levels, means for determining a correction level, means for calculating a power law correction for each channel and means for applying the power law correction to the input image data to give a corrected output image.

* * * * *